United States Patent
Cerda Varela et al.

(10) Patent No.: US 12,297,869 B2
(45) Date of Patent: May 13, 2025

(54) METHOD FOR REPLACING A SLIDING PAD OF A ROTATIONAL SLIDING BEARING, SLIDING BEARING AND WIND TURBINE

(71) Applicant: Siemens Gamesa Renewable Energy A/S, Brande (DK)

(72) Inventors: Alejandro Cerda Varela, Copenhagen East (DK); Niels Karl Frydendal, Herning (DK); Kim Thomsen, Skørping (DK); Morten Thorhauge, Ry (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 27 days.

(21) Appl. No.: 17/919,555

(22) PCT Filed: Apr. 27, 2021

(86) PCT No.: PCT/EP2021/060929
§ 371 (c)(1),
(2) Date: Oct. 18, 2022

(87) PCT Pub. No.: WO2021/219602
PCT Pub. Date: Nov. 4, 2021

(65) Prior Publication Data
US 2023/0341000 A1   Oct. 26, 2023

(30) Foreign Application Priority Data
Apr. 28, 2020 (EP) ................................. 20171732

(51) Int. Cl.
*F03D 80/70* (2016.01)
*B23P 15/00* (2006.01)
(Continued)

(52) U.S. Cl.
CPC ............ *F16C 43/02* (2013.01); *B23P 15/003* (2013.01); *F03D 80/70* (2016.05); *F16C 17/03* (2013.01);
(Continued)

(58) Field of Classification Search
CPC ............. B23P 15/003; Y10T 29/49638; Y10T 29/49726; F03D 80/70; F16C 43/02; F16C 2237/00; F16C 2360/31; F05B 2230/80
See application file for complete search history.

(56) References Cited

U.S. PATENT DOCUMENTS 6,568,859 B1   5/2003   Stegmeier
6,814,493 B2   11/2004  Wobben
(Continued)

FOREIGN PATENT DOCUMENTS

AT   521940 A1    6/2020
CA   2390266 A1   1/2003
(Continued)

OTHER PUBLICATIONS

International Search Report & Written Opinion for PCT/EP2021/060929, mailed on Jul. 12, 2021.
(Continued)

*Primary Examiner* — Jermie E Cozart
(74) *Attorney, Agent, or Firm* — Schmeiser, Olsen & Watts LLP

(57) ABSTRACT

A method for replacing a sliding pad of a rotational sliding bearing, wherein the bearing includes a plurality of sliding pads each supporting an annual rotatable part of the bearing on a stationary part of the bearing in an axial direction and/or a radial direction, including the steps: removing a load of the rotatable part from the sliding pad to be removed by releasing a force applied to the sliding pad and/or by applying a
(Continued)

force to the rotatable part, removing the sliding pad in an axial and/or a radial direction, inserting a replacement sliding pad, supporting the rotatable part on the replacement sliding pad by applying a force to the replacement sliding pad and/or by removing the force applied to the rotatable part.

7 Claims, 6 Drawing Sheets

(51) Int. Cl.
    *F16C 17/03*     (2006.01)
    *F16C 43/02*     (2006.01)

(52) U.S. Cl.
    CPC ....... *F05B 2230/80* (2013.01); *F05B 2240/50* (2013.01); *F16C 2237/00* (2013.01); *F16C 2360/31* (2013.01); *Y10T 29/49638* (2015.01); *Y10T 29/49726* (2015.01)

(56) References Cited

U.S. PATENT DOCUMENTS

| | | | |
|---|---|---|---|
| 2009/0034887 | A1 | 2/2009 | Fujikawa et al. |
| 2011/0057451 | A1* | 3/2011 | Volmer .................. F03D 80/70 290/55 |
| 2012/0055024 | A1* | 3/2012 | Kawano ................ F16C 35/077 29/898.01 |
| 2012/0224799 | A1 | 9/2012 | Wagner |
| 2014/0086516 | A1 | 3/2014 | Pedersen et al. |
| 2017/0260970 | A1 | 9/2017 | Stiesdal |
| 2019/0085827 | A1 | 3/2019 | Frydendal et al. |
| 2020/0011304 | A1 | 1/2020 | Damgaard et al. |
| 2020/0011382 | A1 | 1/2020 | Burdeshaw et al. |
| 2020/0088234 | A1 | 3/2020 | Lüneburg et al. |
| 2021/0301793 | A1 | 9/2021 | Kofman et al. |
| 2024/0093723 | A1 | 3/2024 | Frydendal et al. |

FOREIGN PATENT DOCUMENTS

| | | | | |
|---|---|---|---|---|
| CN | 102758843 | A | 10/2012 | |
| CN | 117739014 | A | 3/2024 | |
| DE | 92 07 013 | U1 | 7/1992 | |
| DE | 10043936 | A1 | 4/2002 | |
| DE | 102009049769 | A1 | 4/2011 | |
| DE | 102015216763 | A1 | 3/2017 | |
| DE | 102017105576 | A1 | 9/2018 | |
| DE | 102020108248 | B3 | 9/2021 | |
| EP | 2302239 | B1 | 8/2012 | |
| EP | 2511521 | A1 * | 10/2012 | ............. F03D 80/70 |
| EP | 2 711 568 | A1 | 3/2014 | |
| EP | 2711569 | B1 | 12/2014 | |
| EP | 2697505 | B1 | 3/2015 | |
| EP | 2921728 | A1 | 9/2015 | |
| EP | 2796740 | B1 | 3/2017 | |
| EP | 3 219 984 | A1 | 9/2017 | |
| EP | 3 460 272 | A1 | 3/2019 | |
| EP | 3 594 495 | A1 | 1/2020 | |
| KR | 20130040089 | A | 4/2013 | |
| WO | 02099294 | A2 | 12/2002 | |
| WO | 2011/045435 | A1 | 4/2011 | |
| WO | 2011127510 | A1 | 10/2011 | |
| WO | 2020176918 | A1 | 3/2017 | |
| WO | 2017/162250 | A1 | 9/2017 | |
| WO | 2018024410 | A1 | 2/2018 | |
| WO | 2020043250 | A1 | 3/2020 | |

OTHER PUBLICATIONS

Wang Huan-dong—Mechanical & Electrical Technique of Hydropower Station (vol. 38. No. 1); (Zhejiang FF Electrical Power Equipment CO., Ltd, Hangzhou 311201, China) Jan. 2015 DOI: 10.13599/j.cnki. 11-5130.2015.01.002; China Academic Journal Electronic Publishing House. All rights reserved.

Kukla, Sebastian—Dissertation—Increasing the load capacity of large radial tilting segment bearings through axial profiling of the segment running surface—Erhöhung der Tragfähigkeit großer Mündl. Prüfung: Eingereicht Radialkippsegmentlager durch axiale Profilierung der Segmentlauffläche; Fakultät für Maschinenbau der Ruhr—Universität Bochum / mündl. Prüfung Nov. 24, 2017 /eingereicht Oct. 11, 2017; 2017.

* cited by examiner

METHOD FOR REPLACING A SLIDING PAD OF A ROTATIONAL SLIDING BEARING, SLIDING BEARING AND WIND TURBINE

CROSS-REFERENCE TO RELATED APPLICATIONS

This application claims priority to PCT Application No. PCT/EP2021/060929, having a filing date of Apr. 27, 2021, which claims priority to EP Application No. 20171732.9, having a filing date of Apr. 28, 2020, the entire contents both of which are hereby incorporated by reference.

FIELD OF TECHNOLOGY

The following relates to a method for replacing a sliding pad of a rotational sliding bearing, wherein the bearing comprises a plurality of sliding pads each supporting an annular rotatable part of the bearing on a stationary part of the bearing in an axial direction and/or a radial direction. Furthermore, the following relates to a sliding bearing and a wind turbine.

BACKGROUND

In wind turbines, rotatable components like the hub or a rotatable shaft have to be supported on the stationary parts of the wind turbine. Therefore, one or more bearings are used. Due to the loads, which act on the rotatable parts of the wind turbine during operation, a bearing used to support the rotatable components of the wind turbine on the stationary components may suffer from wear or damage so that repair procedures and/or maintenance procedures for maintaining the functionality of the bearing involving a removal of the bearing from the wind turbine are frequently required. However, due to the size and the weight of the bearings, especially of a main bearing of a wind turbine, these procedures may be tedious and involve external cranes and, in the case of offshore wind turbines, also the usage of vessels for supporting the external crane used for removal and/or replacement of the bearing.

In EP 3 460 272 A1, a method for changing a bearing component of a main bearing of a wind turbine is described. The bearing component is unloaded by mechanically moving the shaft, wherein the bearing component is then moved axially from or into its mounting position by a replacement tool device.

SUMMARY

An aspect relates to a method for replacing a sliding pad of a rotational sliding bearing that can be conducted with a reduced effort.

According to embodiments of the invention, this problem is solved by a method as initially described, wherein the method comprises the steps:
- Removing a load of the rotatable part from the sliding pad to be removed by releasing a force applied to the sliding pad and/or by applying a force to the rotatable part,
- Removing the sliding pad in an axial and/or a radial direction,
- Inserting a replacement sliding pad,
- Supporting the rotatable part on the replacement sliding pad by applying a force to the replacement sliding pad and/or by removing the force applied to the rotatable part.

The sliding bearing comprises a plurality of sliding pads, tilting sliding pads or non-tilting sliding pads, respectively, which support the rotatable part of the bearing on the stationary part of the bearing in an axial and/or radial direction. A sliding pad may comprise several components, e.g., an outer sliding part, a support part for attachment to a structure by bolts or similar, a tilting support part to ensure that the sliding pad is able to tilt and/or a resilient means like e.g. a spring to ensure a preloading of the sliding pad and the tilting support. The sliding pads of the bearing may be arranged for instance in between the annular rotatable part and a stationary part of the bearing supporting the rotatable part on the stationary part. The bearing may be in particular a fluid film bearing, wherein a fluid film is located between the sliding pads and the rotatable part, or the stationary part, respectively.

The load of the rotatable part is removed from the sliding pad by releasing a force applied to the sliding pad and/or by applying a force to the rotatable part, so that one or more of the sliding pads become unloaded. In this state, the rotatable part is supported on the stationary part via the remainder of the sliding pads. The unloading of a sliding pad to be replaced may occur by removing a force, which acts on the sliding pad pressing it towards the rotatable part. After removing the force, the sliding pad is not tensioned anymore between the rotatable part and the stationary part. Additionally, or alternatively, the sliding pad to be replaced can also be unloaded by applying a force in particular directly to the rotatable part, so that the rotatable part is lifted and/or displaced and the weight of the rotatable part is not supported anymore on the sliding pad to be replaced.

Afterwards, the unloaded sliding pad can be removed in an axial and/or a radial direction of the bearing. The sliding pad can be removed in a radial inward direction to the centre of the bearing, hence in the direction of a centre point of the annular rotatable part. Alternatively, the sliding pad can be removed in a radial outward direction. Also, a combination of an axial and a radial movement for removing the sliding pad is possible. The removal of the sliding pad at least partly in a radial direction has the advantage that no access, or a reduced access space, respectively, from the axial direction to the sliding bearing is required. Furthermore, both sliding pads that support the bearing in the axial direction and sliding pads that support the rotatable part in the radial direction on the stationary part can be removed at least partly in the radial direction facilitating the replacement of the sliding pad.

After the removal of the sliding pad in an axial and/or a radial direction, a replacement sliding pad is inserted at the position of the removed sliding pad. The replacement sliding pad may be for instance a new sliding pad or it can be the removed sliding pad, which has been subject to maintenance and/or repair procedures, for instance cleaning procedures or the like. Also, the insertion of the replacement sliding pad may occur in a radial direction, in particular in reverse direction to the removal of the sliding pad.

After insertion of the replacement sliding pad, the rotatable part of the bearing is supported on the replacement sliding pad by applying a force to the replacement sliding pad and/or by removing the force applied to the rotatable part. By applying a force to the replacement sliding pad, the replacement pad is pushed towards and/or pressed on the rotatable part of the bearing, so that the rotatable part is supported again on the sliding pad and therefore also supported on the stationary part of the bearing. Additionally, or alternatively, also the force, which has been applied to the rotatable part for unloading the sliding pad, may be removed, so that the rotatable part is supported on the sliding pad again.

The method for replacing the sliding pad according to embodiments of the invention has the advantage that the sliding pads can be exchanged in-situ and one by one, so that an exchange of the entire bearing is not required even if all sliding pads of the bearing have to be replaced. This facilitates the maintenance of the bearing, in particular for bearings used as main bearing in a wind turbine. Providing a plurality of sliding pads in the bearing allows for supporting the rotatable part on the stationary part on the remaining sliding pads of the bearing during the removal of the load of the rotatable part from one of the sliding pads, or a part of the sliding pads, respectively. This facilitates the repair and/or the maintenance of the sliding bearing since for instance a one-by-one replacement of damaged or worn sliding pads becomes possible. Also, an updating of the bearing by replacing the mounted sliding pads by improved sliding pads as replacement pads is possible.

Contrary to an exchange of the entire bearing, no external cranes and/or vessels are required. Furthermore, since only single sliding pads are removed or inserted, respectively, the replacement of the sliding pads may be performed manually and/or by usage of a lifting device manually installable prior to the replacement procedure in the vicinity of the bearing. This significantly reduces the effort for replacing one or more of the sliding pads of the bearing facilitating repair procedures and/or maintenance procedures and reducing their costs.

In an embodiment of the invention, the stationary part is annular, wherein the rotatable part is arranged on an outer circumference of the stationary part, wherein the sliding pad is replaced from an interior of the stationary part through an opening in the outer circumference of the stationary part. The replacement of the sliding pad from an interior of the stationary part, hence the removal of the sliding pad and the insertion of a replacement sliding pad, has the advantage that the sliding pads are easily accessible from the interior of the stationary part, in particular when the bearing is used as a main bearing in a wind turbine.

The stationary part may be for instance a hollow shaft, or connected to a hollow shaft, respectively, wherein the sliding pads are accessible from the interior of the hollow shaft through one or more openings in the outer circumference of the stationary part. The sliding pads, which are arranged for instance between the outer circumference of the stationary part and the rotatable part arranged on an outer circumference of the stationary part and supported by the sliding pads on the stationary part, may be removed and/or replaced at least partly in a radial direction towards the interior, hence towards the centre, of the stationary part. The stationary part may provide one or more openings in its outer circumference, which allow to access the sliding pads. For instance, one corresponding opening per sliding pad may be provided. The size of the openings may correspond to the size of the respective sliding pads, so that each sliding pad may be moved through one of the openings towards the interior of the stationary part for the replacement.

In an embodiment, the sliding pad is fixed to the bearing by a bolted connection applying a force to the sliding pad, wherein the force is released by untightening of the bolted connection, and/or by a form-fit connection, wherein the sliding pad is arranged in a cavity or a recess of the stationary part. By untightening the bolted connection, the force may be removed to unload the sliding pad, so that it can be removed for instance towards the interior of the stationary part. Vice versa, the replacement sliding pad can be inserted and fixed again to the bearing by tightening of the bolted connection after the replacement of the sliding pad. The bolted connection may apply a force to the sliding pad enabling a support of the rotatable part on the sliding pad. By untightening the bolted connection, the force can be removed from the sliding pad and the sliding pad is unloaded, or the rotatable part is unsupported from the sliding pad, respectively. Vice versa, by tightening of the bolted connection, the force can be applied again to the sliding pad re-establishing the support of the rotatable part on the sliding pad. Additionally, or alternatively, the sliding pad is fixed to the bearing by a form-fit connection, wherein the sliding pad is arranged in a cavity or a recess of the stationary part. The cavity or the recess may be in particular an integral part of the stationary part and may be located in particular in its outer circumference. The sliding pad may be fixed in the cavity or the recess, respectively, by the rotating part resting on the sliding pad. One side of the cavity, or the recess, respectively, may comprise an axial opening for replacement of an unloaded sliding pad, in particular a radially supporting sliding pad.

In an embodiment of the invention, the force is applied to the rotatable part using an actuator arrangement comprising at least one actuator, in particular at least one mechanical actuator and/or at least one hydraulic actuator. The at least one actuator of the actuator arrangement may push away the rotatable part from the sliding pad, so that the sliding pad is unloaded from the weight of the rotatable part. Therefore, already a small displacement, for instance about 1 mm, is sufficient. By the actuator arrangement, a force to the rotatable part can be applied prior to the replacement of the sliding pad and removed after replacement of the sliding pad, respectively. As a hydraulic actuator, for instance a hydraulic jack may be used.

The actuator arrangement and/or the bearing may comprise a mechanical fixture device which fixes the rotatable part in its displaced position for securing it for instance in the event of a power loss of a hydraulic actuator. As mechanical actuator, for instance a screw or a threaded bolt may be used to push away the rotatable part from the stationary part. It is possible that at least one mechanical actuator and at least one hydraulic actuator are used, wherein the at least one mechanical actuator is used as mechanical fixture device to secure the rotatable part displaced by the at least one hydraulic actuator in the displaced position.

In an embodiment, an axial force on the rotatable part of the bearing for replacement of an axially supporting sliding pad and/or a radial force for replacement of a radially supporting sliding pad is applied by the actuator arrangement. For replacement of a sliding pad, which supports the rotatable part of the bearing in a radial direction on the stationary part, a radial force may be applied to the rotatable part by the actuator arrangement unloading the radially supporting sliding pad. For unloading an axially supporting sliding pad, an axial force may be applied to the rotatable part by the actuator arrangement for unloading the axially supporting sliding pad. For unloading a sliding pad, which supports the rotatable part both in a radial and in an axial direction, a combination of a radial force and an axial force can be applied to the rotatable part using the actuator arrangement. The actuator arrangement may comprise one or more radial actuators, which can apply each a radial force, and/or one or more axial actuators, which can apply each an axial force.

In an embodiment of the invention, at least one actuator of the actuator arrangement is detachably mounted to the bearing prior to the removal of the load from the sliding pad to be replaced and/or at least one actuator of the actuator arrangement is permanently mounted to the bearing. The unloading of the sliding pad can be conducted using an actuator arrangement which is permanently mounted to the bearing. This allows for instance to arrange the at least one actuator of the actuator arrangement inside a bearing case, so that the actuator can act directly on the rotatable part of the bearing.

It is also possible that at least one actuator of the actuator arrangement is detachably mounted to the bearing prior to the removal of the load from the sliding pad to be replaced, so that no actuator has to be provided as part of the bearing.

An actuator of the actuator arrangement mounted in the course of the replacement procedure may be attached for instance to an outer side of a bearing case of the bearing, wherein the force created by the at least one actuator is applied for instance by coupling a piston of the actuator to the rotatable part of the bearing. The actuator may be fixed on either the stationary part or the rotatable part, wherein the actuator is coupled to the respective other part allowing a displacement between the rotatable part and the stationary part of the bearing to unload one or more of the sliding pads. For coupling, the piston of the actuator may be arranged inside an orifice of a bearing cover, the stationary part and/or the rotatable part, respectively.

In an embodiment of the invention, prior to the insertion of the replacement sliding pad, a surface treatment of a surface of the stationary part and/or a surface of the rotatable part is conducted. The surface treatment may be for instance a surface milling operation conducted to clean and/or to repair a surface of the stationary part and/or a surface of the rotatable part. This allows to clean the surface at the position of the sliding pad, so that for instance dirt and/or residues from the sliding pad can be removed from the surfaces. Also, corrosion and/or fretting effects can be removed by the surface treatment.

Therefore, a portable machining device may be mounted in the space where the sliding pad is usually mounted. The surface milling operation may be carried out for instance on an interface of the stationary part with the sliding pad to remove affected material. In an embodiment, the milling device may include a cover arrangement adapted to the size of an opening of the outer circumference of the stationary part, in which the milling device is inserted. By the cover arrangement, the surface that is subject to the surface treatment may be covered to seal the treated surface from the surrounding, in particular from the interior of the bearing. This may prevent contamination of an interior of the bearing, hence an undesired intrusion of dust or the like created during the surface treatment into an interior of the bearing is inhibited.

A sliding bearing according to embodiments of the invention comprises an annular rotatable part, a stationary part and a plurality of sliding pads, wherein the stationary part is annular and the rotatable part is arranged on a circumference of the stationary part, wherein the rotatable part is supported on the stationary part by the sliding pads in a radial and/or an axial direction, wherein the stationary part comprises a plurality of axial and/or radial openings arranged circumferentially and/or axially displaced in the circumference of the stationary part, wherein the sliding pads are removable and/or insertable through the openings.

By providing the openings in the circumference of the stationary part, an axial and/or radial removal and/or an axial and/or radial insertion of the sliding pads is enabled. The rotatable part may be arranged either on an inner circumference of the stationary part or on an outer circumference of the stationary part. In an embodiment, for each sliding pad used to support the rotatable part on the stationary part, one corresponding opening is provided in the circumference of the stationary part allowing a replacement of each of the sliding pads. Sliding pads, that support a rotatable part arranged on the outer circumference of the stationary part, may be removed in a radial inward direction towards a centre point of the annular stationary part. In an embodiment, sliding pads that support a rotatable part on the inner circumference of the stationary part may be replaced in a radially outward direction through the openings in the circumference of the stationary part. Radially supporting sliding pads may be removed for instance from an inside of the bearing by moving them axially out of a cavity, or a recess, respectively, comprising an axial opening and housing the radially supporting sliding pad.

In an embodiment of the invention, the bearing comprises an actuator arrangement with one or more actuators, in particular at least one mechanical actuator and/or at least one hydraulic actuator, wherein the actuator arrangement is adapted for removing a load of the rotatable part from at least one of the sliding pads. The at least one actuator of the actuator arrangement may be arranged inside a bearing case of the bearing. It is also possible that the at least one actuator is mounted to an outside of a bearing case of the bearing, wherein a coupling of the actuator towards the rotatable part and the stationary part occurs for instance via a piston. It is also possible that the bearing comprises at least one mechanical actuator and at least one hydraulic actuator, wherein the at least one mechanical actuator is used to secure the rotatable part displaced by the at least one hydraulic actuator in the displaced position.

In an embodiment of the invention, the at least one actuator of the actuator arrangement is arranged circumferentially displaced from the sliding pads. The sliding pads may be arranged between the stationary part and the rotatable part circumferentially and/or axially displaced for supporting the rotatable part both in the radial and/or the axial direction on the stationary part. In an embodiment, the at least one actuator of the actuator arrangement is arranged circumferentially displaced from each of the sliding pads. By providing an actuator arrangement comprising a plurality of actuators, the individual actuators may be arranged for instance circumferentially in between the sliding pads so that a compact size of the bearing is obtained.

In an embodiment of the invention, the actuator arrangement comprises at least one radial actuator arranged at least partly in between the stationary part and the rotatable part for applying a radial force on the rotatable part and/or at least one axial actuator arranged at least partly between the rotatable part and a protrusion on the circumference of the stationary part for applying an axial force on the rotatable part. The protrusion may be for instance a bearing cover mounted to the stationary part or a protrusion of the circumference of the stationary part. The protrusion may protrude from the circumference in particular adjacently to the rotatable part, so that at least one actuator may be arranged between the protrusion and the rotatable part for applying a force on the rotatable part for unloading one or more of the sliding pads.

In an embodiment, the bearing comprises a bearing case, wherein the actuator arrangement is arranged inside the bearing case. The bearing case may be formed for instance at least partly by a bearing cover and/or the rotatable part and/or the stationary part, wherein the bearing case houses in particular the contact area between the sliding pads, the rotatable part and/or a fluid used in the bearing.

In an embodiment, the one or more actuators of the actuator arrangement each are fixed to the stationary part or the rotatable part of the bearing. During actuation of the at least one actuator, the actuator fixed to one of the parts of the bearing may couple to the respective other part of the bearing to apply a force on the other part to create a displacement between the stationary part and the rotatable part causing an unloading of at least one of the sliding pads of the bearing. The at least one actuator may be attached directly or indirectly to the stationary part or the rotatable part, respectively.

A wind turbine according to embodiments of the invention comprises a sliding bearing according to embodiments of the invention. For a wind turbine according to embodiments of the invention, the details and advantages of a sliding bearing according to embodiments of the invention apply. For a wind turbine according to embodiments of the invention and for a sliding bearing according to embodiments of the invention, also the details and advantages of a method for replacement a sliding pad of a rotational sliding bearing apply.

BRIEF DESCRIPTION

Some of the embodiments will be described in detail, with reference to the following figures, wherein like designations denote like members, wherein.

DETAILED DESCRIPTION

Figure 1:
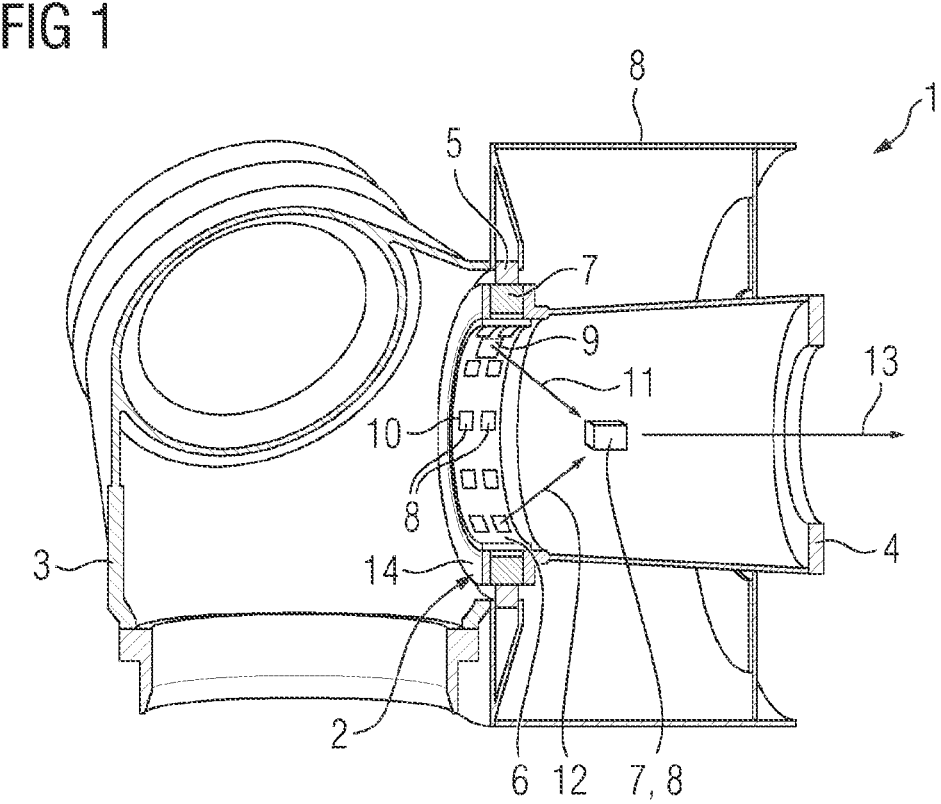
FIG. 1 shows an embodiment of a wind turbine.

In FIG. 1, a detail of a wind turbine 1 according to embodiments of the invention is shown. The wind turbine 1 comprises a sliding bearing 2, which supports a hub 3 on a stationary shaft 4 of the wind turbine. The sliding bearing 2 comprises an annular rotatable part 5, which is connected to the hub 3 of the wind turbine 1. Furthermore, the sliding bearing 2 comprises an annular stationary part 6, which is connected to the stationary shaft 4 of the wind turbine 1. It is possible that the stationary part 6 of the bearing is attached to the shaft 4 or that it is fabricated one-piece with the shaft 4.

The sliding bearing 2 further comprises a plurality of radially supporting sliding pads 7 and a plurality of axially supporting sliding pads 8. The radially supporting sliding pads 7 support the rotatable part 5 of the bearing 2 on the stationary part 6 in a radial direction. In an embodiment, the radially supporting sliding pads 8 support the rotatable part 5 of the sliding bearing in an axial direction on the stationary part 6. Between the rotatable part 5 and the sliding pads 7, 8, a fluid film may be arranged allowing a sliding of the rotatable part 5 on the sliding pads 7, 8 during operation of the wind turbine 1.

The rotatable part 5 is arranged on an outer circumference of the stationary part 6. The stationary part 6 comprises a plurality of openings 9, 10, wherein a plurality of first openings 9 each correspond to one of the radially supporting sliding pad 7, and a plurality of second openings 10 each correspond to one of the axially supporting sliding pad 8.

As indicated by the arrow 11, a radially supporting sliding pad 7 can be removed through the corresponding opening 9 in a radial direction towards the centre of the stationary part 6 of the bearing 2. As indicated by the arrow 12, an axially supporting sliding pad 8 can be removed through the corresponding opening 10 towards the centre of the stationary part 6. After removal, the sliding pads 7, 8 can then be transported out of the bearing 2, or the wind turbine 1, respectively, as indicated by the arrow 13. After removal of the sliding pad 7, 8, a replacement sliding pad can be inserted at a position of the removed sliding pad 7, 8 in a reverse movement. In particular, the replacement of the sliding pads 7, 8 may be performed manually and/or by usage of a lifting device manually installed prior to the replacement procedure in the vicinity of the bearing 2.

Since the rotatable part 5 of the sliding bearing 2 is supported on the stationary part 6 via the sliding pads 7, 8, a sliding pad 7, 8 to be removed has to be unloaded from the weight of the rotatable part 5, or the components of the wind turbine 1 connected to the rotatable part 5, respectively.

It is also possible that the opening 9 is an axial opening of a radially cavity or a radially recess, in particular a radially inward recess in the outer circumference, of the stationary part housing the radially supporting sliding pad, so that the unloaded sliding pad may be removed in an axial direction from the recess axially towards one side of the bearing, in particular towards a side connected to the hub 3 of the wind turbine 1, and/or in a radial direction towards the interior of the bearing 2. Also, a tilted orientation of the opening 9 to the outer circumference of the stationary part 6 is possible so that the sliding pad 7 may be removed and/or replaced in a combined axial and radial movement. In a loaded state, the sliding pad 7 is fixed in a form-fit connection in the recess, wherein after unloading the sliding pad 7, a replacement of the sliding pad 7 becomes possible.

In an embodiment of a method for replacing a sliding pad 7, 8 of a rotational sliding bearing 2 first a load of the rotatable part 5 from the sliding pad 7, 8 is removed by releasing a force applied to the sliding pad 7, 8 and/or by applying a force to the rotatable part 5. Afterwards, the unloaded sliding pad 7, 8 is removed in an axial and/or a radial direction and a replacement sliding pad 7, 8 is inserted. Then, the rotatable part 5 is supported on the replacement sliding pad 7, 8 by applying a force to the replacement sliding pad 7, 8 and/or by removing the force applied to the rotatable part 5.

Different ways of unloading at least one of the sliding pads 7, 8 are described in relation to the following figures.

Figure 2:
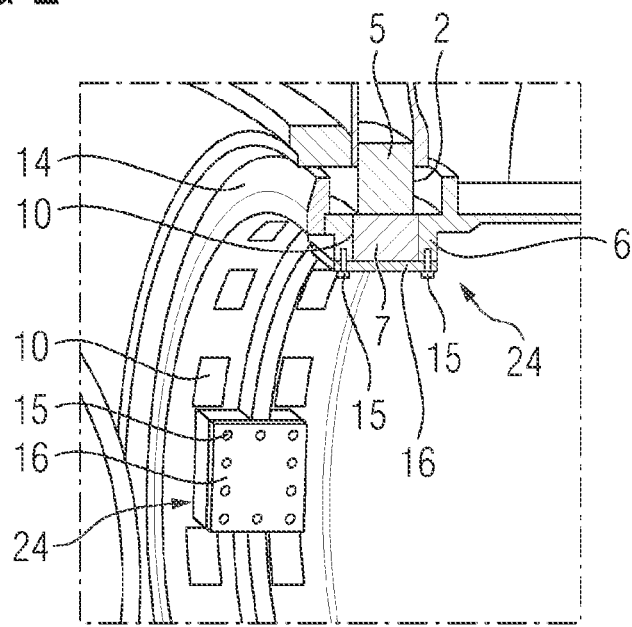
FIG. 2 shows a detailed view on an embodiment of a sliding bearing.

In FIG. 2, a first embodiment of a sliding bearing 2 is shown. Due to the section view, a sliding pad 7 is discernible supporting the rotatable part 5 on the stationary part 6. The radially supporting sliding pad 7 is engaged in an opening 10 of the stationary part 6 of the bearing 2. The radially supporting sliding pad 7 is in contact with the rotatable part 5 of the bearing 2 inside a bearing case, wherein the bearing case is formed by the rotatable part 5, the stationary part 6 and a bearing cover 14. The bearing case covers in particular the contact area between the sliding pad 7 and the rotatable part 5 as well as a fluid film in between the sliding pads 7, 8 and the rotatable part 5 of the bearing 2.

The radially supporting sliding pad 7 is fixed to the bearing 2 by a bolted connection 24 comprising a plurality of bolts 15 fixating a cover plate 16 to the stationary part 6. By tightening the bolted connection 24, hence by bolting the plate 16 to the stationary part 6 using the bolts 15, the radially supporting sliding pad 7 is pressed against the rotatable part 5 of the bearing 2. In a mounted state of the radially supporting sliding pad 7, a force is acting on the sliding pad due to the weight of the rotatable part 5 of the bearing 2 and/or due to the bolted connection 24, respectively.

For removing the load of the rotatable part 5 from the radially supporting sliding pad 7, the bolted connection 24 can be released and the plate 16 can be removed. Afterwards, the sliding pad 7 can be removed from the bearing 2 in a radial direction towards the centre of the stationary part 6. After insertion of a replacement sliding pad 7 into the opening 10, the plate 16 can be fixed again to the stationary part 6 by tightening the bolted connection 24. By tightening the bolted connection 24, the rotatable part 5 of the bearing 2 is supported again on the replaced sliding pad 7. When one of the radially supporting sliding pads 7 is unloaded, the rotatable part 5 on the bearing is supported on the remainder of the radially supporting sliding pad 7 of the bearing and/or the axially supporting sliding pads 9 of the bearing 2, respectively.

Figure 3:
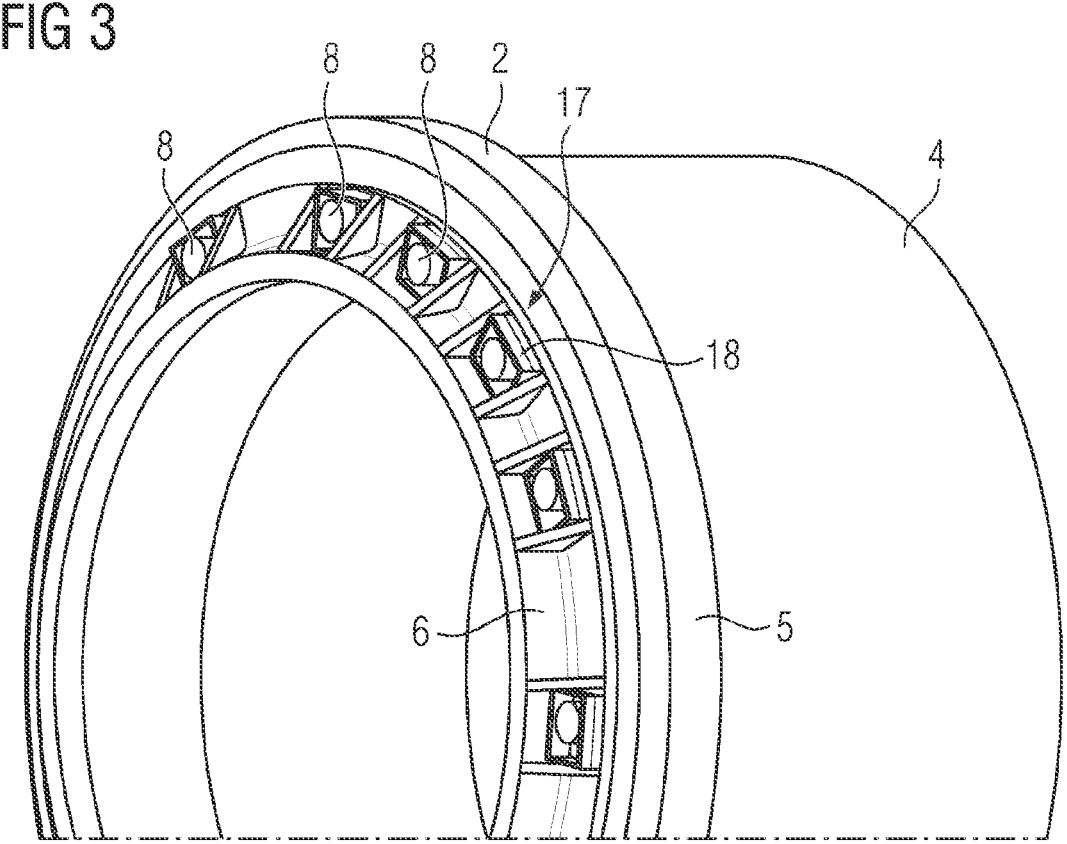
FIG. 3 shows a perspective view on the embodiment of the sliding bearing.

In FIG. 3, a perspective view on the first embodiment of the sliding bearing 2 is shown. Besides a plurality of radially supporting sliding pads 7, the bearing 2 comprises a plurality of axially supporting sliding pads 8, which are fixed on the stationary part of the bearing each by a bolted connection 17 comprising a plurality of bolts (not shown) and a fixation member 18. Note that the bearing cover 14 is not shown, so that the axially supporting sliding pads 8 can be seen. Also, the radially supporting sliding pads 7 and their respective fixatures are not shown.

The axially supporting sliding pads 8 support the rotatable part 5 of the bearing 2 to the stationary part 6 in the axial direction of the bearing 2. Also, one of the axially supporting sliding pads 8 may be unloaded by untightening the bolted connection 17 and by removing the fixation member 18. The axially supporting sliding pad 8 may then be removed in a radial direction, either in a radially outward direction from the bearing 2 or in a radially inward direction to the centre of the stationary part 6 through an opening 10 of the stationary part 6 of the bearing 2. A replacement sliding pad 8 may then be inserted through the opening 10 in a reverse movement and the rotatable part 5 may be supported on the replacement sliding pad 8 by tightening of the bolted connection 17 fixating the sliding pad 8 using the fixation member 18.

Figure 4:
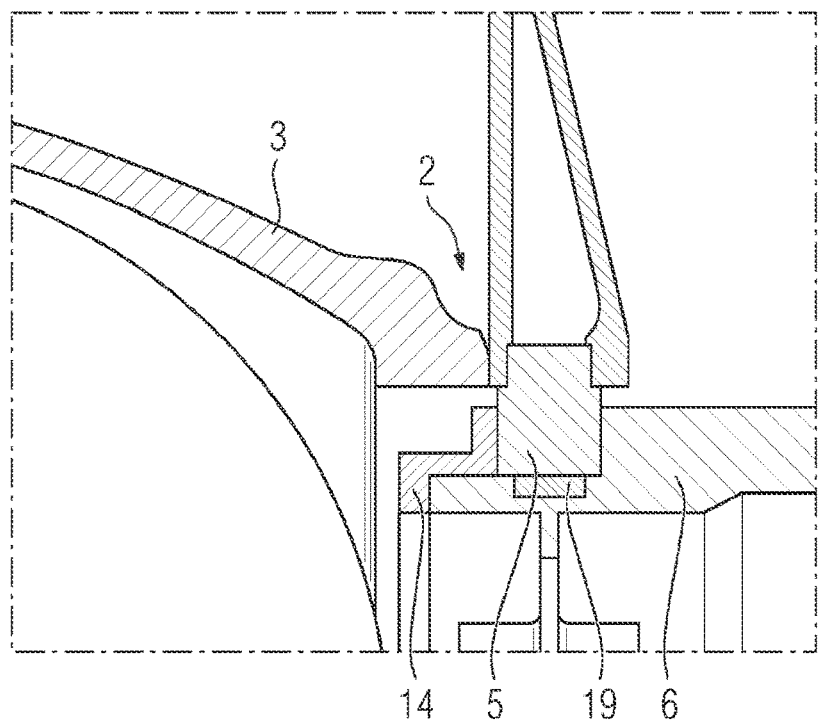
FIG. 4 shows a second embodiment of a sliding bearing.

In FIG. 4, a second embodiment of a sliding bearing 2 is shown. The bearing 2 comprises an actuator arrangement comprising a plurality of actuators 19. The actuators 19 are installed permanently inside the bearing case formed at least partly by the bearing cover 14, the rotatable part 5 and the stationary part 6 housing the sliding pads 7, 8 and a fluid film of the bearing 2. As actuator 19, a hydraulic jack is used. By the actuator 19, a displacement between the stationary part 6 and the rotatable part 5 can be created. The actuator 19 can therefore be connected for instance to a pump of the bearing 2 or of a wind turbine 1, which comprises the bearing 2, respectively. Also, a connection of the actuator 19 to an external pump is possible.

To unload one or more radially supporting sliding pads 7, especially one or more radially supporting sliding pads 7 that are arranged circumferentially next to the depicted actuator 19, a small displacement of approximately 1 mm of the rotatable part 5 is sufficient to unload the sliding pad 7. The displacement is created by applying a force to the rotatable part 5 using the actuator 19. After applying a force to the rotatable part 5, hence after pushing the rotatable part 5 slightly away from the stationary part 6, or the radially supporting sliding pad 7, respectively, the radially supporting sliding pad 7 is unloaded from the rotatable part 5 and can be removed. Therefore, for instance a cover plate 16 like previously described may be unattached to remove the radially sliding pad 7 through a corresponding opening 9.

Figure 5:
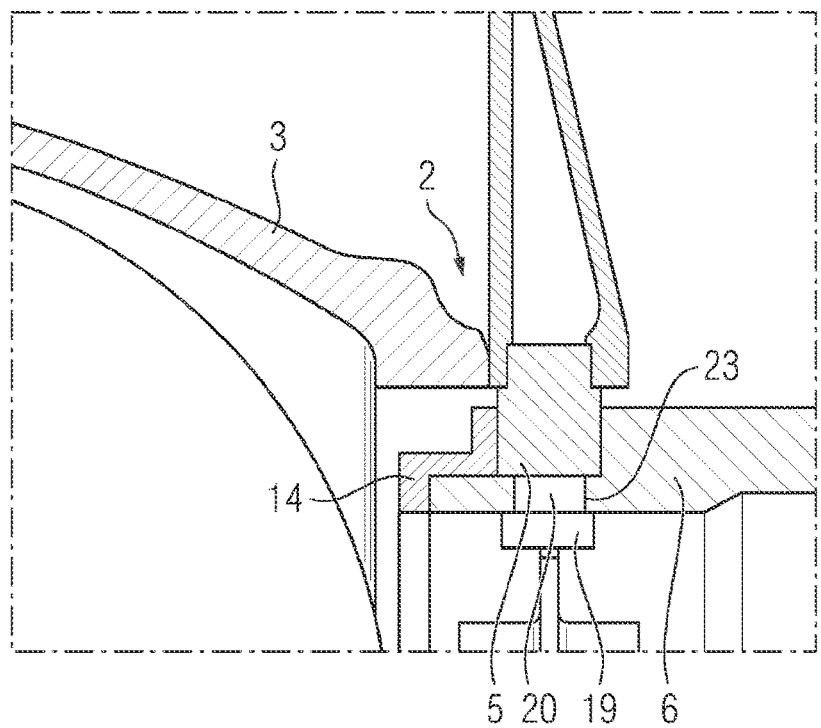
FIG. 5 shows a third embodiment of a sliding bearing.

In FIG. 5, a third embodiment of a sliding bearing 2 is shown. In this embodiment, the hydraulic jack used as actuator 19 is attached to an inner wall of the stationary part 6 and therefore outside of the bearing case of the sliding bearing 2. The actuator 19 is fixed to the stationary part 6 and connected to the rotatable part 5 by a piston 20 of the actuator 19. The piston 20 is arranged in an orifice 23 of the stationary part 6. Therefore, a displacement between the rotatable part 5 and the stationary part 6 of the bearing 2 can be created by pushing away slightly the rotatable part 5 from the stationary part 6 to unload at least one radially supporting sliding pad 7 in the vicinity of the actuator 19. The actuator 19 is a radial actuator applying a force in the radial direction to the rotatable part 5.

Figure 6:
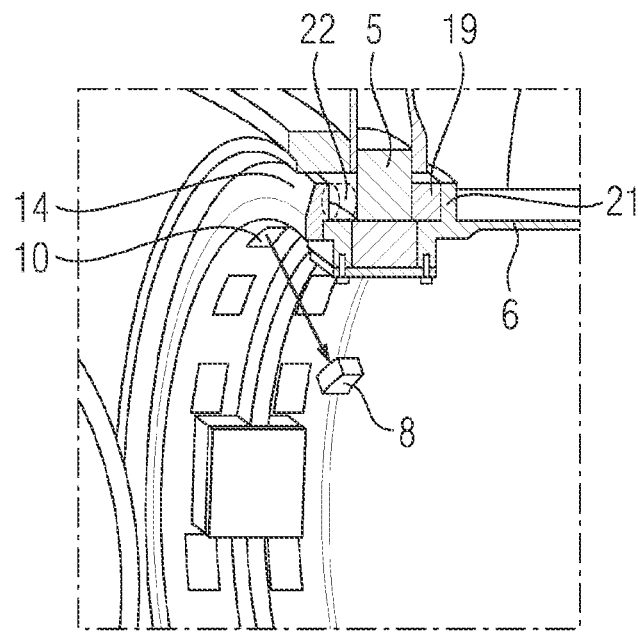
FIG. 6 shows a fourth embodiment of a sliding bearing.

In FIG. 6, a fourth embodiment of a sliding bearing 2 is shown. The sliding bearing 2 comprises a plurality of actuators 19 arranged between a protrusion 21 of the stationary part 6 and a rotatable part 5 of the bearing 2. The protrusion protrudes from the outer circumference of the stationary part 6 adjacent to the rotatable part 5. By the actuators 19, which may be each a hydraulic jack, an axial displacement between the rotatable part 5 and the stationary part 6 of the bearing 2 can be created to unload at least one of the axial sliding pads 8 located next to the actuator 19.

The axially supporting sliding pads 8 are arranged circumferentially displaced to the actuators 19. In an alternative position 22, the actuators 19 may be arranged between the rotatable part 5 of the bearing 2 and a protrusion of the stationary part 6, which is created by the bearing cover 14 attached to the stationary part 6. In particular, a plurality of actuators 19 and a plurality of axially supporting sliding pads 8, especially a plurality of pairs of adjacently arranged sliding pads 8, are arranged alternatingly in circumferential direction. The actuators 19 may be arranged in both positions, for instance alternatingly. In both positions, the actuators 19 are axial actuators applying an axial force to the rotatable part 5.

After unloading one or more of the axial sliding pads 8 using one or more of the actuators 19, the axial sliding pad 8 can be removed through the opening 10 in a radially inward direction of the stationary part 6. Afterwards, in a method for replacing the sliding pad, a replacement sliding pad 8 can be inserted through the opening 10 and the rotatable part 5 can be supported again on the replacement sliding pad 8 by removing the force applied to the rotatable part 5 by the actuator 19.

Besides the positioning of the actuator 19 inside the bearing case of the bearing 2, also positioning of at least one actuator 19 to the outside of the bearing case is possible as described in the following embodiments.

Figure 7:
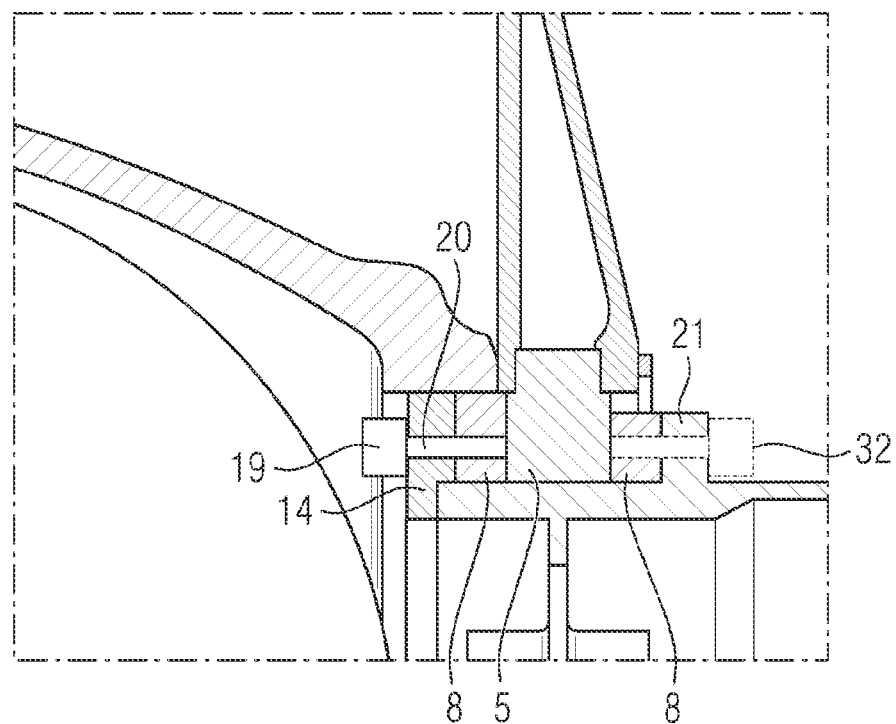
FIG. 7 shows a fifth embodiment of a sliding bearing.

In FIG. 7, a fifth embodiment of a sliding bearing 2 is shown. In this embodiment, the actuator 19 is arranged outside of the bearing case of the bearing 2. The actuator 19 is fixed to a bearing cover 14 of the bearing 2 and is therefore fixed to the stationary part 6 of the bearing 2. The actuator 19 is connected to the rotatable part 5 of the bearing 2 by a piston 20 of the actuator 19 that is arranged in an orifice of the bearing cover 14, so that a displacement between the rotatable part 5 and the stationary part 6 can be created using the actuator 19. By pushing the rotatable part 5 away from the bearing cover 14, the one or more axially supporting sliding pads 8 circumferentially adjacent to the actuator 19 are unloaded and may be removed as previously described through the opening 10 of the stationary part 6 of the bearing 2.

To remove an axially supporting sliding pad 8 arranged on the opposing side of the rotatable part 5, an actuator 19 may be attached in an alternative position 32 to the protrusion 21 of the stationary part 6 to allow for a displacement between the rotatable part 5 and a stationary part 6 of the bearing 2 in an opposing direction, so that the axially supporting sliding pad 8 between the protrusion 21 and the rotatable part 5 of the bearing 2 may be removed.

Figure 8:
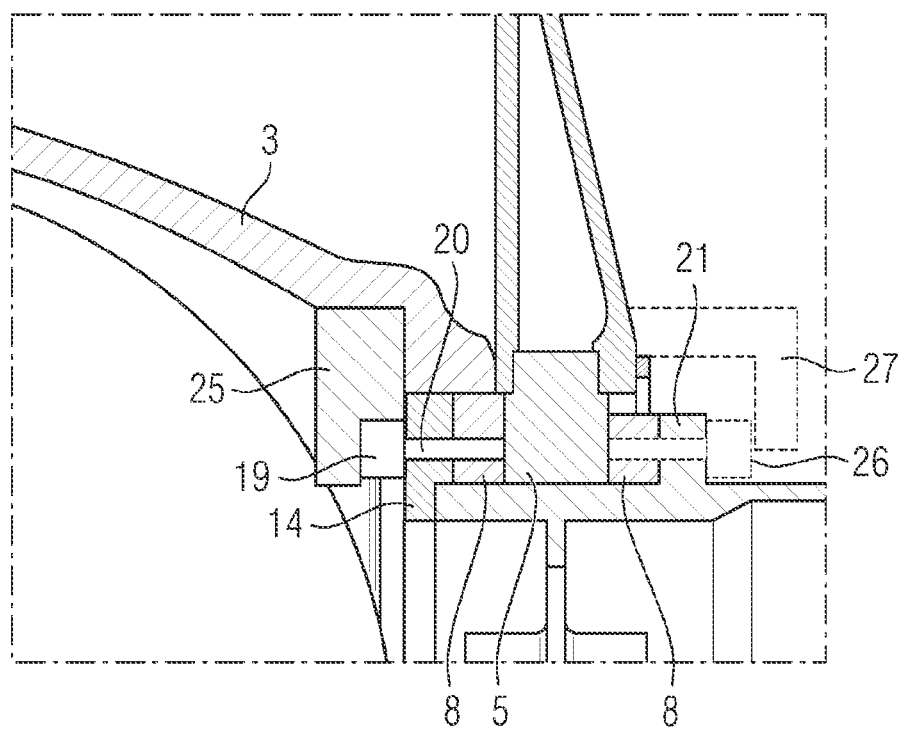
FIG. 8 shows a sixth embodiment of a sliding bearing.

In FIG. 8, a sixth embodiment of a sliding bearing 2 is shown. In this embodiment, the actuator 19 is fixed to the rotating part 5 of the bearing 2. Therefore, the actuator 19 may be fixed for instance to a hub 3 connected to the rotating part 5 of the bearing using a fixture 25. A displacement between the rotatable part 5 and the stationary part 6 of the bearing 2 can be created using the piston 20 of the actuator 19 so that at least one axially sliding pads 8 arranged between the bearing cover 14 and the rotatable part 5 can be unloaded and removed as previously described.

Also, an attachment of the actuator 19 on an opposing side is possible as depicted by the alternative position 26, in which the actuator 19 is fixed to the rotatable part 5 using a fixture 27 to unload the axially supporting sliding pad 8 between the rotatable part 5 and the protrusion 21 of the stationary part 6.

Figure 9:
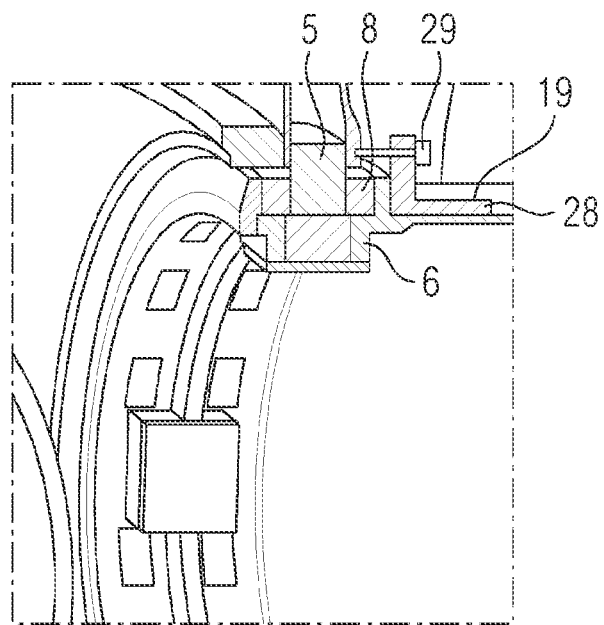
FIG. 9 shows a seventh embodiment of a sliding bearing.

In FIG. 9, a seventh embodiment of a sliding bearing 2 is shown. In this embodiment, a mechanical actuator comprising a base section 28 and a threaded bolt 29 is used as an actuator 19. The displacement between the rotatable part 5 and a stationary part 6 of the bearing 2 can be created by actuation of the bolt 29. The bolt 29 of the actuator 19 can be actuated for instance manually or using an electric motor connector to the bolt 29. By moving the bolt 29 through a threaded portion of the base section 28, a displacement between the rotatable part 5 and the stationary part 6 of the bearing 2 can be created to unload one or more axially supporting sliding pads 8. During replacement of the sliding pad 8, the rotatable part 5 is supported by the mechanical actuator.

In an embodiment, such a mechanical actuator can be also used as an alternative to a hydraulic actuator in the respective positionings. It is also possible to use a mechanical actuator in addition to a hydraulic actuator, wherein the mechanical actuator is used to secure the rotatable part 5 in its displaced position.

Figure 10:
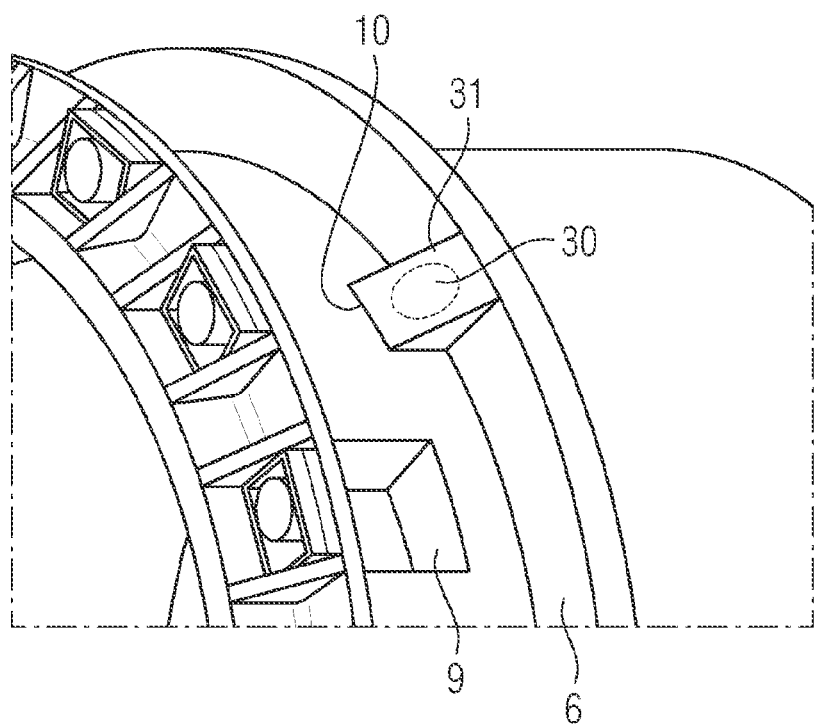
FIG. 10 shows an insertion of a milling device during a method for replacing a sliding pad according to embodiments of the invention.

In FIG. 10, a milling tool 30 inserted in an opening 10 corresponding to an axially supporting sliding pad 8 is shown schematically. The milling tool 30 comprises a cover 31 corresponding to the shape of the opening 10 covering a surface trimming portion of the milling tool 30 from the interior of the bearing 2, so that for instance a surface treatment of a portion of the stationary part 6 and/or the rotatable part 5 can be conducted without the risk of dirt entering the interior of the bearing 2, or the interior of the bearing case of the bearing 2, respectively. In an embodiment, a milling tool 30 with a cover 31 corresponding to the shape of an opening 9 for replacement of a radially supporting sliding pad 7 may be used.

The step of surface treatment can be conducted in a method for replacing a sliding pad 7, 8 after removing the sliding pad 7, 8 and prior to the insertion of a replacement sliding pad. The surface treatment may be conducted to account for damage and/or wear of the rotatable part 5 and/or the stationary part 6.

In all embodiments, the actuator arrangement and/or the bearing 2 may comprise a mechanical fixture device which fixes the rotatable part 5 in its displaced position for securing it for instance in the event of a power loss of a hydraulic actuator or a mechanical actuator, respectively. It is in particular possible that a bearing 2 comprises a plurality of actuators 19 arranged in different positions combining two or more of the aforementioned embodiments.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for replacing a sliding pad of a rotational sliding bearing, wherein the bearing comprises a plurality of sliding pads each supporting an annular rotatable part of the bearing on a stationary part of the bearing in an axial direction and/or a radial direction, the method comprising:
   removing a load of the annular rotatable part from the sliding pad to be removed by releasing a force applied to the sliding pad and/or by applying a force to the annular rotatable part;
   removing the sliding pad in the axial and/or the radial direction;
   inserting a replacement sliding pad, and
   supporting the annular rotatable part on the replacement sliding pad by applying a force to the replacement sliding pad and/or by removing the force applied to the angular rotatable part;
   wherein the stationary part comprises a plurality of axial and/or radial openings arranged circumferentially and/or axially displaced in the circumference of the stationary part, and the plurality of sliding pads are removable and/or insertable through the plurality of axial and/or radial openings;
   wherein the stationary part is annular, wherein the annular rotatable part is arranged on an outer circumference of the stationary part, wherein the annular rotatable part is supported on the stationary part by the plurality of sliding pads in the radial and/or the axial direction, wherein the sliding pad is replaced from an interior of the stationary part.

2. The method according to claim 1, wherein the sliding pad is fixed to the bearing by a bolted connection applying a force to the sliding pad, wherein the force is released by untightening of the bolted connection, and/or by a form-fit connection, wherein the sliding pad is arranged in a cavity or a recess of the stationary part.

3. The method according to claim 1, wherein the force is applied to the annular rotatable part using an actuator arrangement comprising at least one actuator.

4. The method according to claim 3, wherein an axial force on the annular rotatable part of the bearing for replacement of an axially supporting sliding pad and/or a radial force for replacement of a radially supporting sliding pad is applied by the actuator arrangement.

5. The method according to, claim 3, wherein at least one actuator of the actuator arrangement is detachably mounted to the bearing prior to a removal of a load from the sliding pad to be replaced and/or that at least one actuator of the actuator arrangement is permanently mounted to the bearing.

6. The method of claim 3, wherein the actuator arrangement comprises at least one mechanical actuator and/or at least one hydraulic actuator.

7. The method according to, claim 1, wherein prior to an insertion of the replacement sliding pad, a surface treatment of a surface of the stationary part and/or a surface of the rotatable part is conducted.

* * * * *